(12) United States Patent
White et al.

(10) Patent No.: US 7,502,204 B2
(45) Date of Patent: Mar. 10, 2009

(54) STRUCTURES FOR ATTACHING A HEAD GIMBAL ASSEMBLY AND AN ACTUATOR ARM

(75) Inventors: Andrew David White, Brooklyn Park, MN (US); David Gerard Wobbe, Jordan, MN (US); Andrew Kelly Putzy, Bloomington, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 390 days.

(21) Appl. No.: 11/303,613

(22) Filed: Dec. 16, 2005

(65) Prior Publication Data

US 2007/0139821 A1 Jun. 21, 2007

(51) Int. Cl.
*G11B 5/48* (2006.01)
(52) U.S. Cl. .................................. 360/244.5
(58) Field of Classification Search ............ 360/244.1, 360/244.2, 244.4, 244.5, 244.6, 244.9; 29/603.03, 29/603.06
See application file for complete search history.

(56) References Cited

U.S. PATENT DOCUMENTS

| | | | |
|---|---|---|---|
| 3,744,008 A | 7/1973 | Castellani | 339/103 B |
| 4,796,122 A | 1/1989 | Levy et al. | 360/98.01 |
| 5,097,584 A | 3/1992 | Cain et al. | 29/407 |
| 5,124,855 A | 6/1992 | Dew et al. | 360/97.02 |
| 5,262,911 A | 11/1993 | Cain et al. | 360/104 |
| 5,444,587 A | 8/1995 | Johnson et al. | 360/104 |
| 5,471,733 A | 12/1995 | Bernett et al. | 29/603 |
| 5,497,282 A | 3/1996 | Hoffmann et al. | 360/104 |
| 5,602,698 A | 2/1997 | Miyazaki et al. | 360/104 |
| 5,631,789 A | 5/1997 | Dion et al. | 360/106 |
| 5,657,531 A | 8/1997 | Sato et al. | 29/603.04 |
| 5,677,815 A | 10/1997 | Chan | 360/106 |
| 5,689,389 A | 11/1997 | Braunheim | 360/104 |
| 5,717,545 A | 2/1998 | Brooks, Jr. et al. | 360/104 |
| 5,731,932 A | 3/1998 | Crane | 360/104 |
| 5,754,371 A * | 5/1998 | Meyer et al. | 360/244.6 |
| 5,759,418 A | 6/1998 | Frater et al. | 216/22 |
| 5,796,555 A | 8/1998 | Aoyagi et al. | 360/104 |
| 5,808,835 A | 9/1998 | Fujiwara | 360/104 |
| 5,812,343 A | 9/1998 | Budde et al. | 360/104 |
| 5,828,521 A | 10/1998 | Haregawa | 360/104 |
| 5,860,206 A | 1/1999 | Tochiyama | 29/603.04 |
| 5,870,252 A | 2/1999 | Hanrahan | 360/104 |
| 6,033,755 A | 3/2000 | Hanrahan et al. | 428/131 |
| 6,046,885 A | 4/2000 | Aimonetti et al. | 360/104 |
| 6,128,164 A | 10/2000 | Kant et al. | 360/244.5 |
| 6,172,852 B1 | 1/2001 | Boutaghou et al. | 360/244.5 |
| 6,183,841 B1 | 2/2001 | Hanrahan et al. | 428/132 |
| 6,195,236 B1 | 2/2001 | Hiraoka et al. | 360/244.5 |
| 6,215,624 B1 * | 4/2001 | Summers et al. | 360/244.5 |
| 6,230,959 B1 | 5/2001 | Heist et al. | 228/155 |

(Continued)

*Primary Examiner*—Tianjie Chen
(74) *Attorney, Agent, or Firm*—Leanne Taveggia Farrell; Westman, Champlin & Kelly, P.A.

(57) ABSTRACT

An assembly for attaching a first element to a second element. The assembly includes a first non-metallic connecting member. The first non-metallic connecting member includes a first member having a first surface and a second member. The second member extends substantially perpendicular from a first end adjacent the first surface to a second end and has an outer surface. Apertures in the first and second elements receive the second member.

13 Claims, 9 Drawing Sheets

U.S. PATENT DOCUMENTS

| | | | |
|---|---|---|---|
| 6,231,698 B1 | 5/2001 | Braunheim et al. | 148/606 |
| 6,351,349 B1 | 2/2002 | Braunheim et al. | 360/244.6 |
| 6,404,593 B1 | 6/2002 | Iwamoto | 360/244.6 |
| 6,417,994 B1 | 7/2002 | Yim et al. | 360/244.6 |
| 6,424,497 B1 | 7/2002 | Coon | 360/244.6 |
| 6,697,224 B2 | 2/2004 | Wang et al. | 360/244.6 |
| 6,700,744 B2 | 3/2004 | Nishida et al. | 360/244.2 |
| 6,704,165 B2 | 3/2004 | Kube et al. | 360/245.9 |
| 6,744,597 B2 | 6/2004 | Nguyen et al. | 360/234.5 |
| 6,754,044 B1 * | 6/2004 | Braunheim et al. | 360/244.6 |
| 6,938,326 B1 * | 9/2005 | Chen et al. | 29/603.03 |
| 7,124,496 B2 * | 10/2006 | Kashima et al. | 29/603.06 |
| 7,170,716 B2 * | 1/2007 | Van Sloun et al. | 360/244.6 |
| 7,199,980 B2 * | 4/2007 | Kashima et al. | 360/244.9 |
| 2002/0051319 A1 * | 5/2002 | Takagi et al. | 360/244.9 |
| 2002/0154445 A1 * | 10/2002 | Wada et al. | 360/244.1 |
| 2005/0275971 A1 * | 12/2005 | Kuroki et al. | 360/244.2 |

* cited by examiner

STRUCTURES FOR ATTACHING A HEAD GIMBAL ASSEMBLY AND AN ACTUATOR ARM

FIELD OF THE INVENTION

The present invention relates generally to data storage systems. In particular, the present invention relates to attaching a suspension assembly to an actuator arm of a data storage system.

BACKGROUND OF THE INVENTION

Disc drives are common data storage devices. A typical disc drive includes a housing that encloses a variety of disc drive components. The components include one or more rotating discs having data surfaces that are coated with a medium for storage of digital information in a plurality of circular, concentric data tracks. The discs are mounted on a spindle motor that causes the discs to spin and the data surfaces of the discs to pass under respective aerodynamic bearing sliders.

The sliders carry transducers, which write information to and read information from the data surfaces of the discs. The slider and transducer are often together referred to as a head. An actuator mechanism moves the heads from track to track across the surfaces of the discs under control of electronic circuitry. The actuator mechanism includes an actuator arm or e-block arm attached to a head gimbal assembly or suspension assembly for each slider. The suspension assembly includes a load beam and a gimbal. The load beam provides a preload force, which forces the head toward the disc surface. The gimbal is positioned between the slider and the load beam, or is integrated in the load beam, to provide a resilient connection that allows the slider to pitch and roll while following the topography of the disc.

Current attachment mechanisms for the suspension assembly do not allow for detachment and reuse. The existing attachment permanently deforms the hub and is not a reworkable process. In addition, the existing attachment is not conducive to the increasing use of non-metallic actuator arms and non-metallic suspension assemblies. For example, metallic ball swaging adds considerable mass and cost to a mount assembly. In another example, the non-reworkable process of ball swaging adds gram and static attitude variation caused by deformation of the baseplate during swaging. The gram and static attitude variation impacts overall system performance.

Embodiments of the present invention provide solutions to these and other problems, and offer other advantages over the prior art.

SUMMARY OF THE INVENTION

The present invention provides an assembly within a data storage system for attaching a first element to a second element. The assembly includes a first non-metallic connecting member. The first non-metallic connecting member includes a first member having a first surface. The first non-metallic component further includes a second member extending substantially perpendicular from a first end adjacent the first surface to a second end. The second member has an outer surface. The second member is receivably engaged with apertures in the first and second elements. The first non-metallic component includes a hole extending continuously through the first member and the second member. The assembly further includes a second component for insertion into the hole of the first non-metallic component.

The present invention further provides an assembly within a data storage system for connecting a first element to a second element. The assembly includes a first non-metallic component having a first member and a second member. The first member includes a first surface and the second member extend substantially perpendicular from a first end adjacent the first surface to a second end and having an outer surface. The first non-metallic component also includes a hole that extends continuously through the first member and the second member. The assembly also includes a second component for insertion into the hole of the first non-metallic component.

The present invention still further provides a suspension assembly. The suspension assembly includes an actuator arm, a load beam and attaching means for securing the load beam to the actuator arm.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
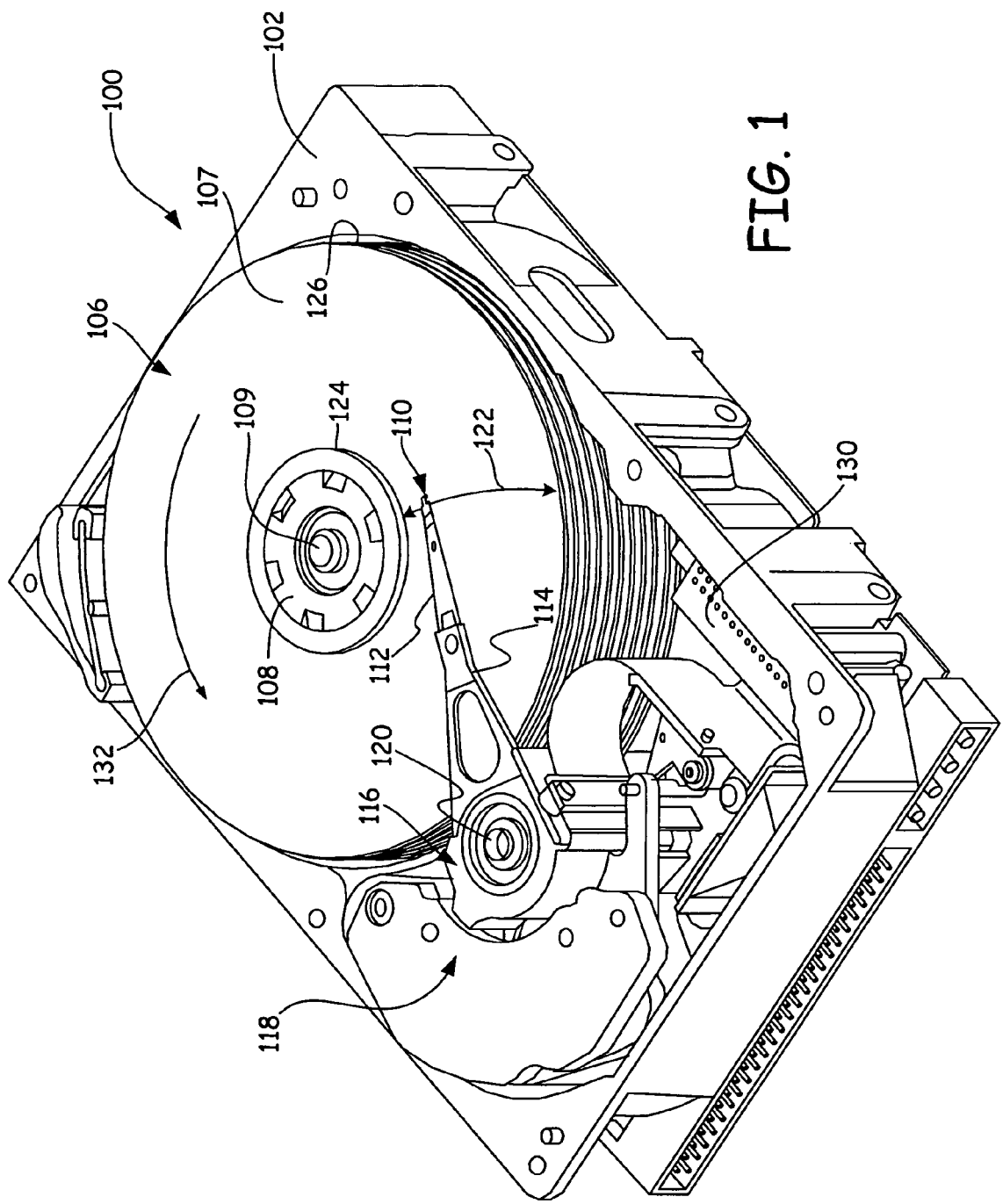
FIG. 1 illustrates a perspective view of a data storage system.

FIG. 1 illustrates a perspective view of a disc drive 100 in which embodiments of the present invention are useful. Disc drive 100 includes a base deck 102 and a top cover (not shown). Disc drive 100 further includes a disc pack 106, which is mounted on a spindle motor (not shown) by a disc clamp 108. Disc pack 106 includes a plurality of individual discs 107, which are mounted for rotation about central axis 109. However, disc drive 100 can also include a single disc that is mounted to a spindle motor by disc clamp 108. Each disc surface can have an associated head 110, which carries a transducer for communication with the surface.

Head 110 is supported by a suspension or load beam 112, which is in turn attached to an actuator arm 114 of an actuator mechanism 116. Actuator mechanism 116 is rotated about a shaft 120 by a voice coil motor 118, which is controlled by servo control circuitry within internal circuit 130. As voice coil motor 118 rotates actuator mechanism 116, head 110 moves in an arcuate path 122 between a disc inner diameter 124 and a disc outer diameter 126.

During operation, as discs 107 rotate in a rotational direction 132, the discs 107 drag air under the respective heads 110 and along their air bearing surfaces. As air passes beneath the air bearing surfaces, air compression along the air flow path causes the air pressure between the disc 107 and the air bearing surfaces to increase, which creates an aerodynamic lifting force that counteracts the preload force provided by load beam 112. The preload force forces head 110 towards the surface of the disc. The aerodynamic lifting force that counteracts the preload force causes the head 110 to lift and fly above, but in close proximity to the disc surface. While FIG. 1 illustrates one manner of actuating a data head proximate a data storage medium, the present invention, however, is applicable to data storage systems that use other actuation techniques, such as a linear actuator.

Figure 2:
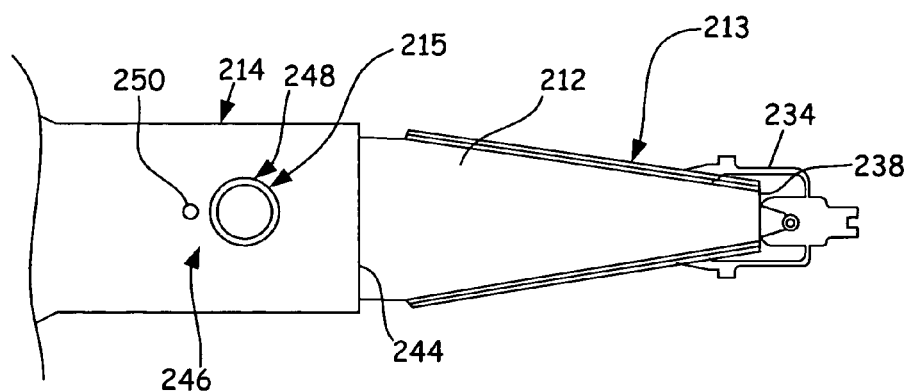
FIG. 2 illustrates a partial top view of an actuator arm and a load beam.

FIG. 2 illustrates a partial top view of an actuator arm 214 and load beam 212 in accordance with an embodiment of the present invention. The actuator arm 214 connects to a head gimbal assembly or suspension assembly 213 with an attachment structure 215. Suspension assembly 213 includes a load beam 212 and a gimbal (or "flexure") 234. Load beam 212 is formed of a single, continuous piece of material, but can be formed with multiple pieces of material in alternative embodiments. Example materials include metallic materials, such as stainless steel, and non-metallic materials, such as various types of polymers and plastics. Exemplary plastics include numerous organic synthetic or processed materials that are mostly thermoplastic or thermosetting polymers. Exemplary polymers include a chemical compound or mixture of compounds formed by polymerization. The examples given for metallic and non-metallic materials of load beam 212 are not limiting but are exemplary. Load beam 212 includes a proximal end (not shown in FIG. 2) and a distal end 238. The proximal end includes a proximal mounting section (also not shown in FIG. 2). The proximal mounting section includes an aperture (also not shown in FIG. 2). Gimbal 234 is attached to distal end 238 of load beam 212 and configured to support a slider. Gimbal 234 can be a separate piece of material that is attached to load beam 212 as shown in FIG. 2 or integrated with load beam 212 as a single, continuous piece of material.

Actuator arm 214 includes an actuator tip 244 having a mount section 246. Actuator arm 214 can be formed of a variety of metallic materials, such as stainless steel, and non-metallic materials, such as polymers and plastics. The examples given for metallic and non-metallic materials of actuator arm 214 are not limiting but exemplary. Mount section 246 includes an actuator aperture 248. Actuator aperture 248 includes an inner wall (as shown at 249 in FIG. 4). Actuator aperture 248 and the load beam aperture are aligned such that the apertures can simultaneously receive a portion of attachment structure 215. Both actuator arm 214 and load beam 212 also include a second set of apertures (one of which is shown at 250). The use of the second set of apertures as well as components of attachment structure 215 will be thoroughly discussed in relation to FIGS. 3 and 4.

Figure 3:
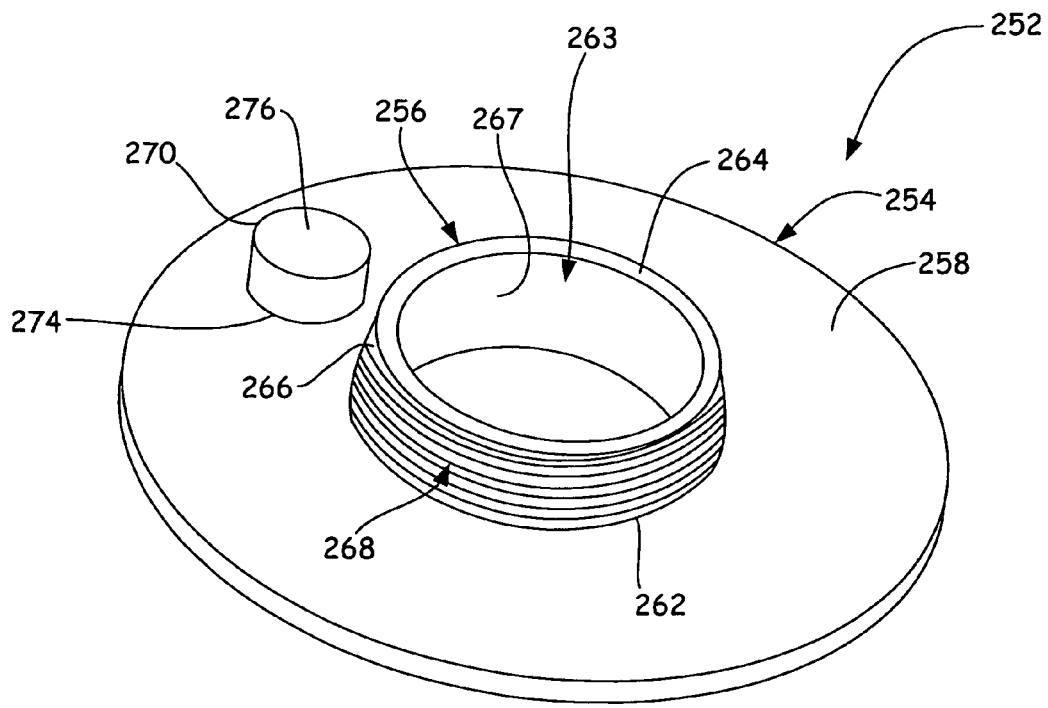
FIG. 3 illustrates a perspective view of a fastening portion of an assembly for use in attaching an actuator arm and a load beam.

FIG. 3 illustrates a perspective view of a first fastening portion 252 for use in attaching load beam 212 (FIG. 2) to actuator arm 214 (FIG. 2) in accordance with an embodiment of the present invention. The example materials given for non-metallic materials of attachment structure 215 are not limiting but exemplary. Fastening portion 252 is a portion of attachment structure 215 (FIG. 2) and comprises a non-metallic material, such as polymers and plastics. Fastening portion 252 includes a first member 254 integrally formed with a second member 256. Although first member 254 and second member 256 are illustrated as being circular members, those skilled in the art should recognize that members 254 and 256 can be other types of shapes. For example, members 254 and 256 can be square or rectangular.

First member 254 includes a first surface 258. Second member 256 is a elongated member that extends substantially perpendicular from a first end 262 adjacent first surface 258 to a second end 264 and has an outer surface 266. Second member 256 of first component 252 is capable of being inserted into and received by the load beam aperture and actuator aperture 248 illustrated in FIG. 2. In addition, component 252 includes a hole 263, which forms an inner surface 267. Hole 263 extends continuously through both first member 254 and second member 256. Although hole 263 is illustrated as having a circular shape, other shapes are possible.

Figure 4:
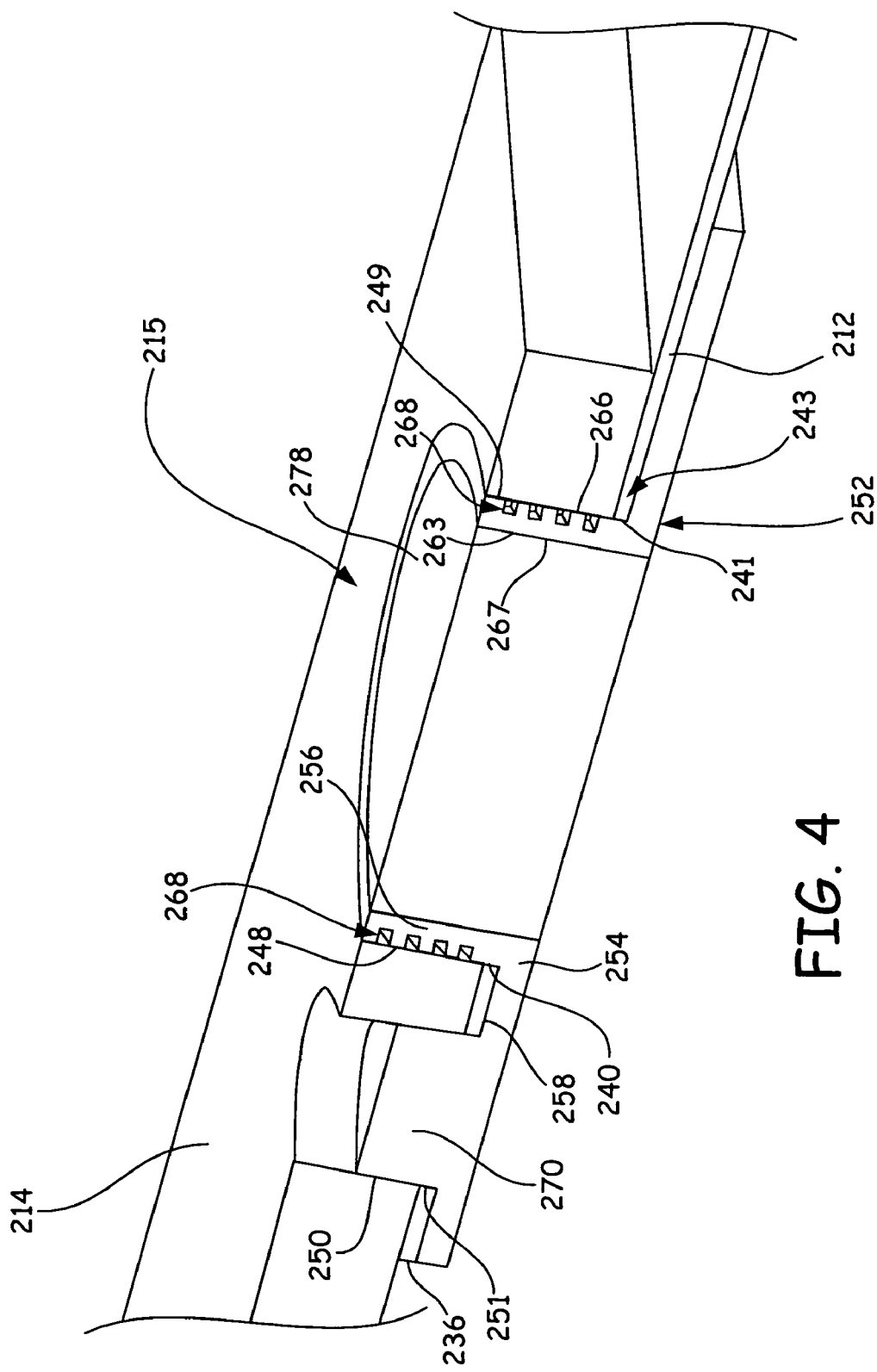
FIG. 4 illustrates a partial perspective sectional view of an actuator arm, a load beam and attachment structure for attaching the actuator arm and the load beam.

FIG. 4 illustrates a partial perspective sectional view of actuator arm 214 and load beam 212 in accordance with an embodiment of the present invention. FIG. 4 illustrates load beam 212 attached to actuator arm 214 with attachment structure 215. FIG. 4 illustrates proximal end 236, proximal mounting section 243 and load beam aperture 240 not previously illustrated in FIG. 2. In FIG. 4, second member 256 of first component 252 is receivably engaged with load beam aperture 240 and actuator arm aperture 248.

Referring to both FIGS. 3 and 4, first fastening portion 252 includes corrugated ridges 268 formed on outer surface 266 of second member 256. In addition, first fastening portion 252 includes a pin feature 270. Pin feature 270 extends substantially perpendicular from a first end 274 adjacent first surface 258 to a second end 276 and is spaced apart from second member 256. Pin feature 270 is receivably engaged with the second set of apertures 250 and 251 included in both actuator arm 214 and load beam 212, respectively. Although pin feature 270 is illustrated as having a circular shape, those skilled in the art will recognize that pin feature 270 can have other types of shapes. For example, pin feature 270 can have a square or rectangular shape. Pin feature 270 is configured to reduce relative rotation between the attached actuator arm 214 and load beam 212.

Referring to FIG. 4, attachment structure 215 also includes a second fastening portion 278. Second fastening portion 278 comprises a metallic or non-metallic material, such as stainless steel, a polymer or plastic. The examples given for metallic and non-metallic materials of second fastening portion 278 are not limiting but exemplary. As illustrated in FIG. 4, second fastening portion 278 is a plastic rod. Second fastening portion 278 is inserted and pressed into hole 263 of first fastening portion 252 after second member 256 is receivably engaged with load beam aperture 240 and actuator aperture 248. In one embodiment, second fastening portion 278 applies a force on inner surface 267 of first component 252 and therefore applies a force on inner wall 241 of load beam aperture 240 and inner wall 249 of actuator aperture 248 after the second component is pressed into aperture 263. In another embodiment, second component 278 applies a force on inner surface 267 such that outer surface 266 of second member 256, having corrugated ridges 268, are compressed against inner wall 241 of load beam aperture 240 and inner wall 249 of actuator aperture 248. The compression of corrugated ridges 268 against inner walls 241 and 249 provides an effective torque retention connection.

Figure 5:
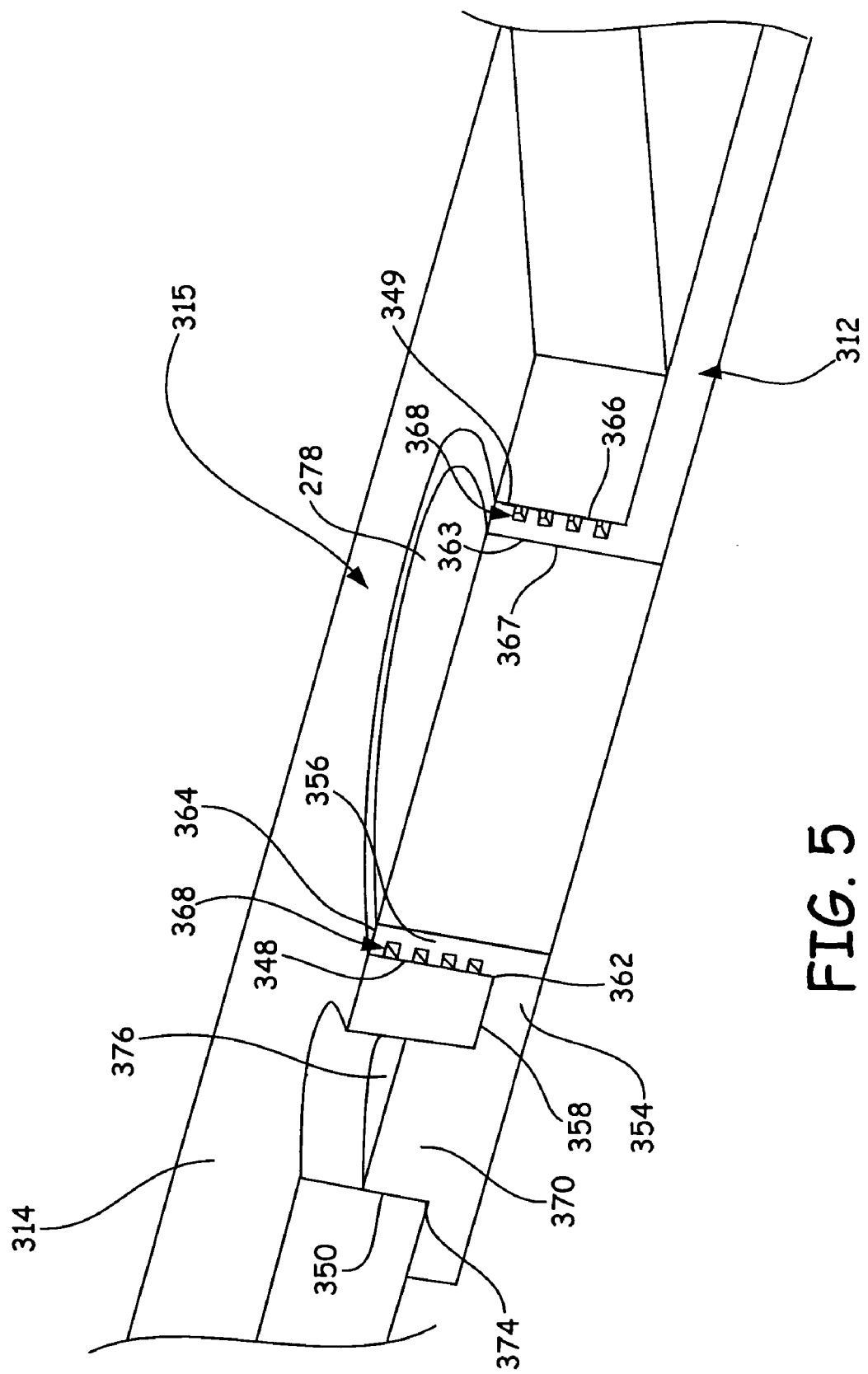
FIG. 5 illustrates a partial perspective sectional view of an actuator arm and load beam including a portion attachment structure for attachment to the actuator arm.

FIG. 5 illustrates a partial perspective sectional view of an actuator arm 314 and load beam 312 in accordance with an embodiment of the present invention. Load beam 312 includes a first member 354 integrally formed with a second member 356. First member 354 and second member 356 form a portion of an attachment structure 315. Actuator arm 314 includes an actuator aperture 348. First member 354 includes a first surface 358. Second member 356 is an elongated member that extends substantially perpendicular from a first end 362 adjacent first surface 358 to a second end 364 and has an outer surface 366. Second member 356 of load beam 312 is receivably engaged with actuator aperture 348. In addition, load beam 312 includes a hole 363, which forms an inner surface 367. Hole 363 extends continuously through both first member 354 and second member 356.

Second member 356 of load beam 312 includes corrugated ridges 368 formed on outer surface 366. In addition, load beam 312 includes a pin feature 370. Pin feature 370 extends substantially perpendicular from a first end 374 (adjacent first surface 358) to a second end 376 and is spaced apart from second member 356. Pin feature 370 is receivably engaged with a second aperture 350 of actuator arm 314. Like pin feature 270 of FIGS. 3 and 4, pin feature 370 can have other types of shapes then a circular shape. Pin feature 370 is configured to reduce relative rotation between an attached actuator arm 314 and load beam 312.

Attachment structure 315 also includes a component 378. Component 378 comprises a metallic or non-metallic material. As illustrated in FIG. 5, component 378 is a plastic rod. Component 378 is inserted and pressed into hole 363 of load beam 312 after second member 356 of load beam 312 is receivably engaged with actuator aperture 348. In one embodiment, component 378 applies a force on inner surface 367 and therefore applies a force on inner wall 349 of actuator aperture 348. In another embodiment, component 378 applies a force on inner surface 367 such that the corrugated ridges 368 positioned on outer surface 366 of second member 356, are compressed against inner wall 349 of actuator aperture 348. The compression of corrugated ridges 356 against inner walls 341 and 349 provides an effective torque retention connection.

Those skilled in the art will recognize that actuator arm 314 in a different embodiment, can include a first member integrally formed with a second member instead of load beam 312. In such as embodiment, load beam 312 includes a load beam aperture. The second member is receivably engaged with the load beam aperture.

The above-described embodiments of attachment structure 215 and attachment structure 315 result in a reduction in pressing force that is needed to attach actuator arm 214 or 314 to load beam 212 or 312 compared to the commonly used metal process of ball swaging. In addition, the above-described non-metallic embodiments of attachment structure 215 and attachment structure 315 are reworkable processes. Reworkable processes allow for easy removal and reuse of attachment structures 215 and 315.

Figure 6:
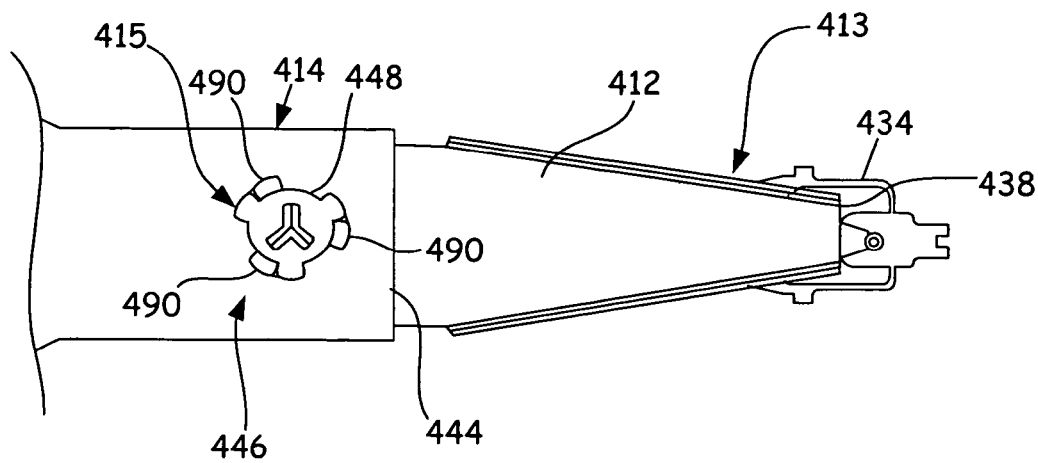
FIG. 6 illustrates a partial top view of an actuator arm and a load beam.

FIG. 6 is a partial top view of an actuator arm 414 and load beam 412 in accordance with an embodiment of the present invention. Actuator arm 414 connects to a head gimbal assembly or suspension assembly 413 with an attachment structure 415. Suspension assembly 413 includes a load beam 412 and a gimbal (or "flexure") 434. Load beam 412 is formed of a single continuous piece of material, but can be formed with multiple pieces of material in alternative embodiments. Example materials include both metallic and non-metallic materials such as stainless steel and various types of polymers and plastics. The examples given for metallic and non-metallic materials of load beam 412 are not limiting but exemplary. Load beam 412 includes a proximal end (not shown in FIG. 6) and a distal end 438. The proximal end includes a proximal mounting section (also not shown in FIG. 6). The proximal mounting section of load beam 412 includes a load beam aperture (also not shown in FIG. 6) for attaching load beam 412 to actuator arm 414. Gimbal 434 is attached to load beam 412 and configured to support a head. FIG. 6 illustrates attachment structure 415 in a position in which load beam 412 and actuator arm 414 are locked together.

Actuator arm 414 includes an actuator tip 444 having a mount section 446. Actuator arm 414 can be formed of a variety of metallic and non-metallic materials, such as stainless steel and various types of polymers and plastics. The examples given for metallic and non-metallic materials of actuator arm 414 are not limiting but exemplary. Mount section 446 includes an actuator aperture 448 for mounting actuator arm 414 to load beam 412. Actuator aperture 448 and the load beam aperture are aligned such that the apertures can simultaneously receive attachment structure 415. Attachment structure 415 will be thoroughly discussed in FIGS. 7 and 8.

Figure 7:
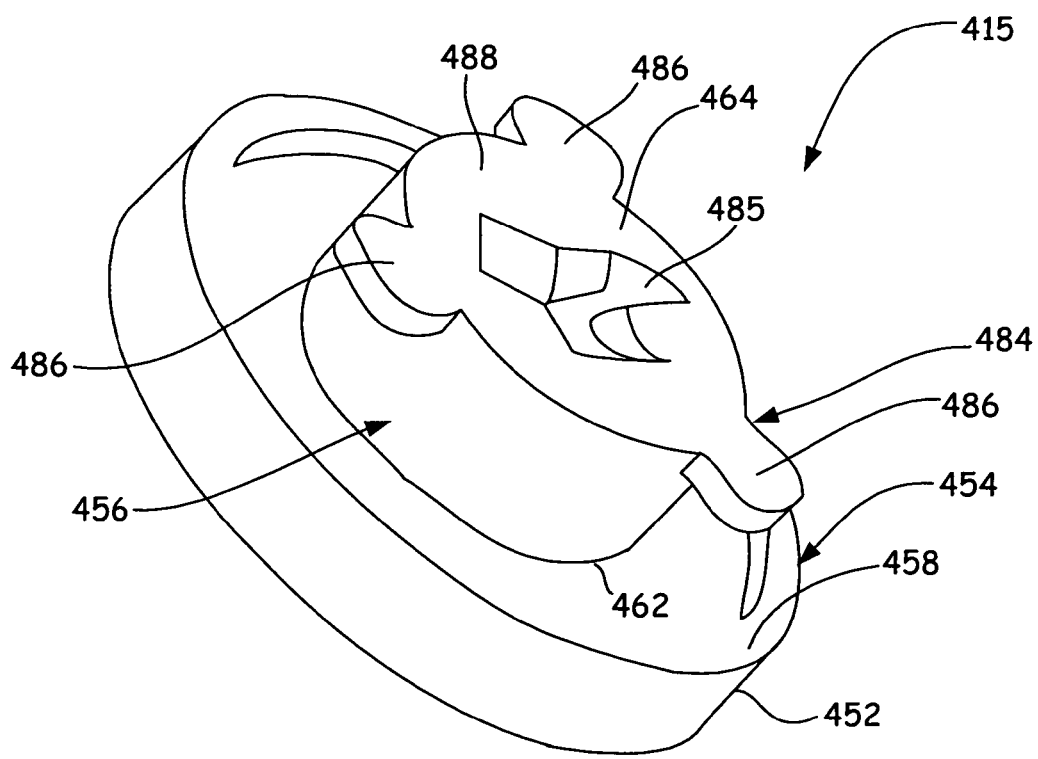
FIG. 7 illustrates a perspective view of an assembly for use in attaching an actuator arm and a load beam.
Figure 8:
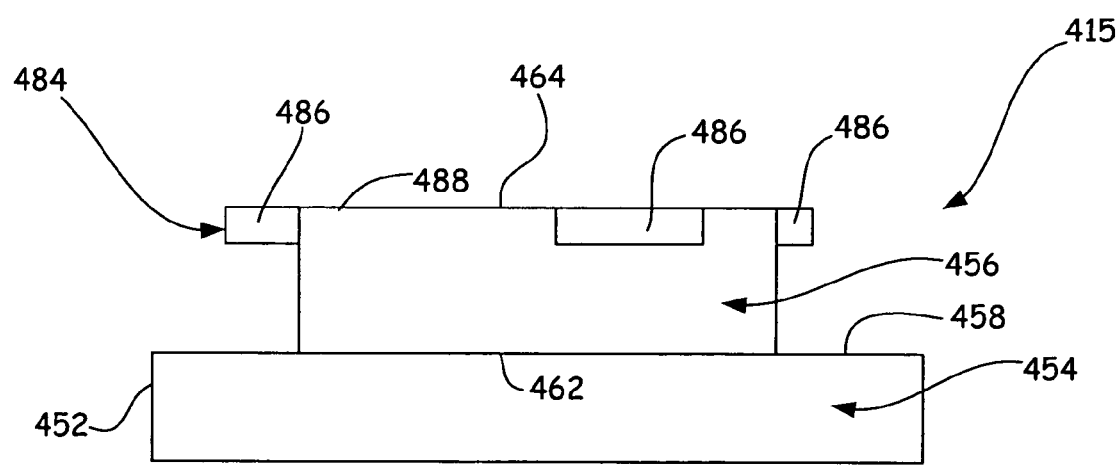
FIG. 8 illustrates a side view of the assembly illustrated in FIG. 7.

FIGS. 7 and 8 are a perspective view and a side view, respectively, of attachment structure 415 for use in attaching actuator arm 414 (FIG. 6) to load beam 412 (FIG. 6) in accordance with an embodiment of the present invention. Attachment structure 415 includes a fastening portion 452. Fastening portion 452 comprises a metallic or non-metallic material, such as stainless steel, a polymer, plastic or other type of similar material. The examples given for metallic and non-metallic materials of fastening portion 452 are not limiting but exemplary. Fastening portion 452 includes a first member 454 integrally formed with a second member 456.

First member 454 includes a first surface 458. Second member 456 is an elongated member that extends substantially perpendicular from first end 462 adjacent first surface 458 to second end 464. Second end 464 of second member 456 includes a locking feature 484. Locking feature 484 includes at least one flange 486 that protrudes substantially perpendicular from the elongated second member 456. A surface 488 of second end 464 also includes a notch 485. Notch 485 is used in connection with manipulating and rotating component 452 into a locked position after second member 456 is inserted into the load beam aperture and actuator aperture 448 (FIG. 6). As illustrated in FIGS. 7 and 8, component 452 has a locking feature 484 that includes three flanges 486. However, those skilled in the art will recognize that locking feature 484 is not limited to three flanges. Any number of flanges can be used.

Figure 9:
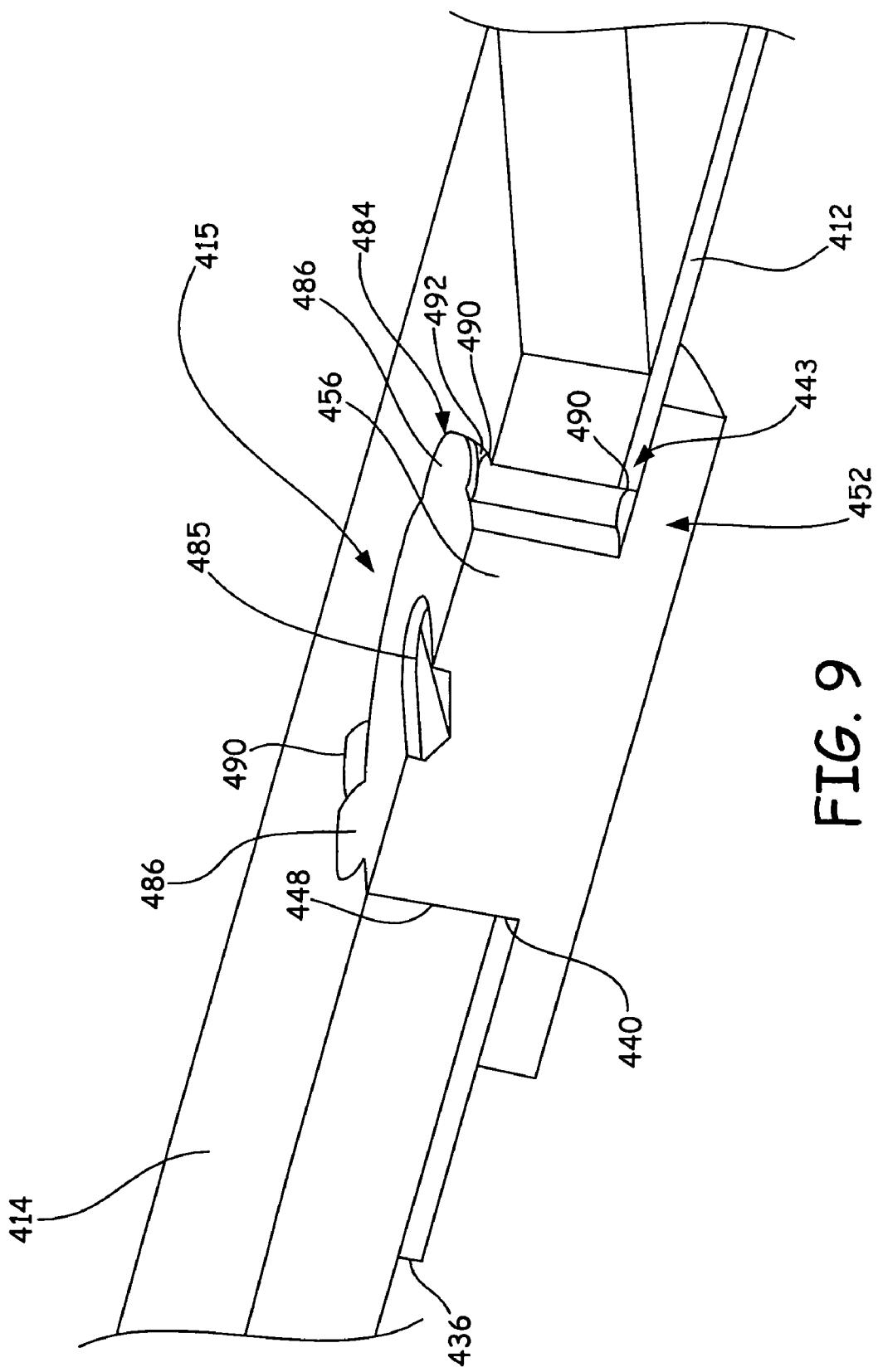
FIG. 9 illustrates a partial perspective sectional view of an actuator arm, a load beam and attachment structure for attaching the actuator arm and the load beam.

FIG. 9 illustrates a partial perspective sectional view of actuator arm 414 and load beam 412 in accordance with an embodiment of the present invention. FIG. 9 illustrates actuator arm 414 attached to load beam 412 with attachment structure 415. FIG. 9 illustrates proximal end 436, proximal mounting section 443 and load beam aperture 440 not previously illustrated in FIG. 6. In FIG. 9, second member 456 of fastening portion 452 is receivably engaged with load beam aperture 440 and actuator aperture 448.

Referring to both FIGS. 6 and 9, actuator aperture 448 and load beam aperture 440 have a shape that corresponds with the shape of second member 456 and locking feature 484. For example, both actuator aperture 448 and load beam aperture 440 are sized to accommodate second member 456 as well as the at least one flange 486 that is included in locking feature 484. The portions of apertures 448 and 440 that accommodate flanges 486 are shown at 490 in FIGS. 6 and 9. Actuator arm 414 includes a flange receiver 492. Each flange receiver 492 is receivably engaged with each flange 486 upon manipulation of notch 485. For example, notch 485 can be manipulated with a screwdriver. Through the manipulation of notch 485, component 452 is rotated such that each flange 486 that was inserted through apertures 448 and 440 is positioned into each flange receiver 492. This type of configuration securely attaches actuator arm 414 to load beam 412.

Figure 10:
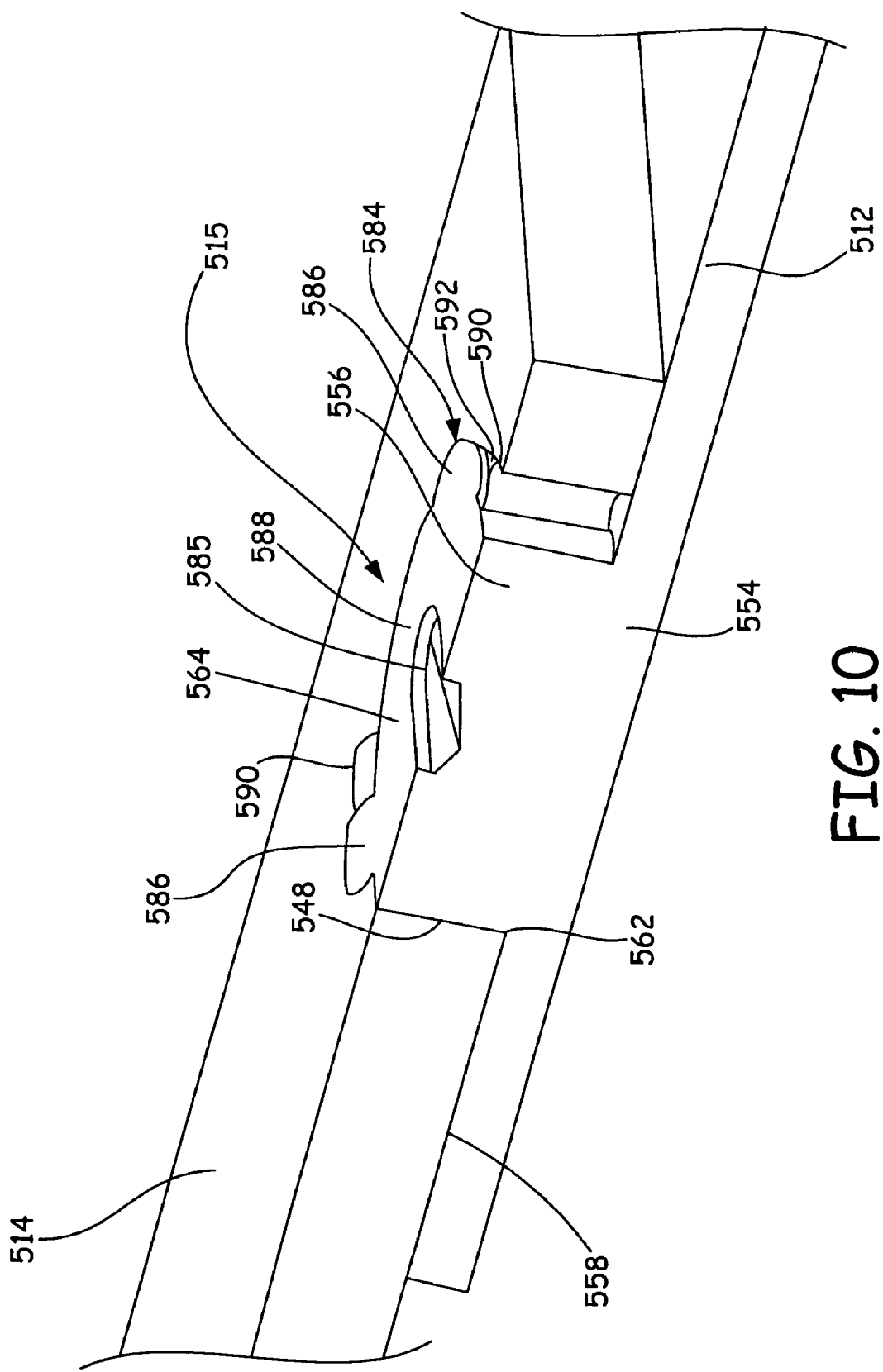
FIG. 10 illustrates a partial perspective sectional view of an actuator arm and a load beam including a portion of an attachment structure for attachment to the actuator arm.

FIG. 10 illustrates a partial perspective section view of an actuator arm 514 and load beam 512 in accordance with an embodiment of the present invention. Load beam 512 includes a first member 554 integrally formed with a second member 556. First member 354 and second member 356 form a portion of an attachment structure 515. Actuator arm 514 includes an actuator aperture 548. First member 554 includes a first surface 558. Second member 556 is an elongated member that extends substantially perpendicular from a first end 562 adjacent first surface 558 to a second end 564. Second member 556 is receivably engaged by actuator aperture 548. Second end 564 of second member 556 includes a locking feature 584. Locking feature 584 includes at least one flange 586 that protrudes substantially perpendicular from the elongated second member 556. A surface 588 of second end 564 also includes a notch 585. Notch 585 is used in connection with manipulating and rotating load beam 512, in its entirety, into a locked position after second member 556 is inserted into actuator aperture 548. Those skilled in the art will recognize that locking feature 584 is not limited to a particular number of flanges. Any number of flanges can be used.

Actuator aperture 548 has a shape that corresponds with the shape of second member 556 and locking feature 584 of load beam 512. For example, actuator aperture 548 is sized to accommodate second member 556 as well as the at least one flange 586 that is included in locking feature 584. The portions of aperture 548 that accommodates flange 486 are shown at 590. Actuator arm 514 includes at least one flange receiver 592. Each flange receiver 592 is receivably engaged with each flange 586 upon manipulation of notch 585. Through the manipulation of notch 585, assembly 515 is rotated such that each flange 586 that was inserted through aperture 548 is positioned into each flange receiver 592. This type of configuration locks load beam 512 securely to actuator arm 514.

Those skilled in the art will recognize that actuator arm 514 in a different embodiment, can include a first member integrally formed with a second member instead of load beam 512. In such as embodiment, load beam 512 includes a load beam aperture. The second member is receivably engaged with the load beam aperture.

Figure 11:
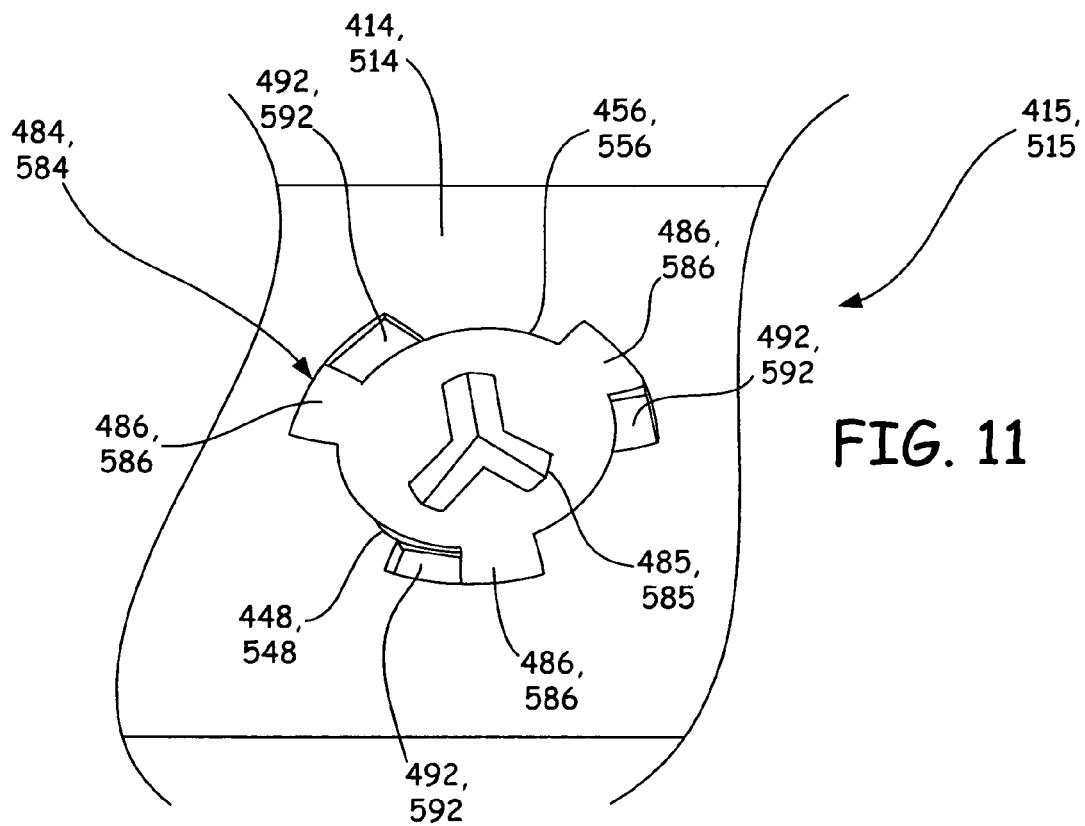
FIG. 11 illustrates a detailed view of an assembly in an unlocked position.
Figure 12:
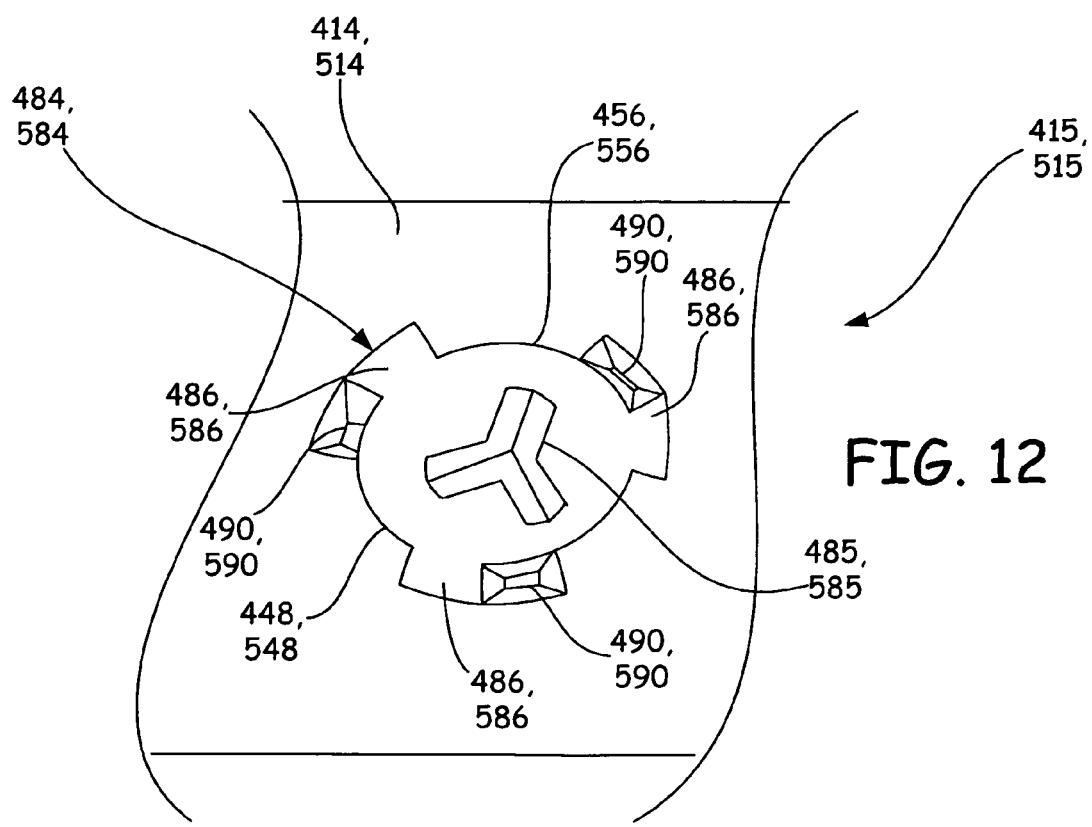
FIG. 12 illustrates a detailed view of an assembly in a locked position.

FIGS. 11 and 12 illustrate a more detailed top view of assemblies 415 and 515 in an unlocked position and a locked position, respectively, in accordance with embodiments of the present invention. FIGS. 11 and 12 illustrate actuator arm 414, 514, second member 456, 556, locking feature 484, 584 having flanges 486, 586 and actuator aperture 448, 548. FIG. 11 also illustrates flange receivers 492, 592. As illustrated in FIG. 11, attachment structures 415, 515 are shown in an unlocked position. Second member 456, 556 has been inserted through actuator aperture 448, 548, but not yet locked into place. FIG. 12 illustrates portions 490, 590 of actuator aperture 448, 548 that accommodate flanges 486, 586. As illustrated in FIG. 12, attachment structures 415, 515 are shown in a locked position. Second member 456, 556 has been rotated using notch 485, 585 from the position illustrated in FIG. 11 and locked into flange receivers 492, 592 to the position illustrated in FIG. 12.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a data storage system, it will be appreciated by those skilled in the art that the teachings of the present invention can be applied to other types of systems, without departing from the scope and spirit of the present invention. Also, those skilled in the art will recognize that the structures and devices referenced in the Specification and figures can be referred to with different terms.

What is claimed is:

1. An assembly within a data storage system for attaching at least a first element to a second element, the assembly comprising:
   a first non-metallic connecting member including:
      a first member having a first surface; and
      a second member extending substantially perpendicular from a first end adjacent the first surface to a second end and having corrugated ridges that protrude outwardly from and are formed with an outer surface of the second member, wherein the second member is receivably engaged with apertures in the first and second elements
   a hole having a uniform width that extends continuously though the first member and the second member;
   a second component for insertion into the hole in the first non-metallic component, the second component including a width that is at least as great as the width of the hole such that upon insertion of the second component into the hole of the first non-metallic connecting member the corrugated ridges of the second member compress against inner walls of the apertures in the first and second elements.

2. The assembly of claim 1, wherein the first element comprises an actuator arm and the second element comprises a load beam.

3. The assembly of claim 1, wherein the second component is non-metallic.

4. The assembly of claim 1, wherein the first non-metallic connecting member comprises a pin feature that extends substantially perpendicular from the first surface of the first member and is spaced apart from the second member, the first element configured to be received by the pin feature.

5. An assembly within a data storage system for connecting a first element and a second element comprising:
   a first non-metallic component comprising:
      a first member having a first surface;
      a second member extending substantially perpendicular from a first end adjacent the first surface to a second end and having an outer surface;
      a hole having a uniform width extending continuously through the first member and the second member; and
   a second component for insertion into the hole of the first non-metallic component, the second component including a width that is at least as great as the width of the hole such that upon insertion of the second component into the hole of the first non-metallic component the second component applies a force on an inner surface of the hole.

6. The assembly of claim 5, wherein the first non-metallic component comprises a load beam and the second component comprises an actuator arm.

7. The assembly of claim 5, wherein the second component comprises a non-metallic material.

8. The assembly of claim 5, wherein the second member is receivably engaged with apertures in the first and second elements.

9. The assembly of claim 5, wherein the outer surface of the second member includes corrugated ridges.

10. The assembly claim 5, wherein the first member comprises a pin feature that extends substantially perpendicular from the first surface of the first member and is spaced apart from the second member, the first element configured to be received by the pin feature.

11. A suspension assembly comprising:
   an actuator arm having a first aperture;
   a load beam having a second aperture;
   an assembly for securing the load beam to the actuator arm, the assembly comprising:
      a first non-metallic component including:
         a first member having a first surface;
         a second member extending substantially perpendicular from a first end adjacent the first surface of the first member and being receivably engaged with the first and second apertures of the actuator arm and the load beam;
         a hole having a uniform width that extends continuously through the first and second members;
      a second component for insertion into the hole in the first non-metallic component, the second component including a width that is at least as great as the width of the hole such that upon insertion of the second component into the hole of the first non-metallic component the second component applies a force on an inner surface of the hole.

12. The suspension assembly of claim 11, wherein the second member of the first non-metallic component comprises corrugated ridges that protrude outwardly from and are formed with an outer surface of the second member, wherein upon insertion of the second component into the hole of the first non-metallic component the second component compresses the corrugated ridges against inner walls of the first aperture of the actuator arm the and the second aperture of the load beam.

13. The suspension assembly of claim 11, wherein the second component is non-metallic.

* * * * *